Patented Mar. 25, 1947

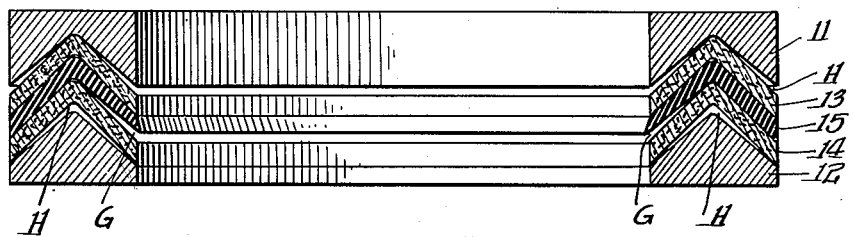
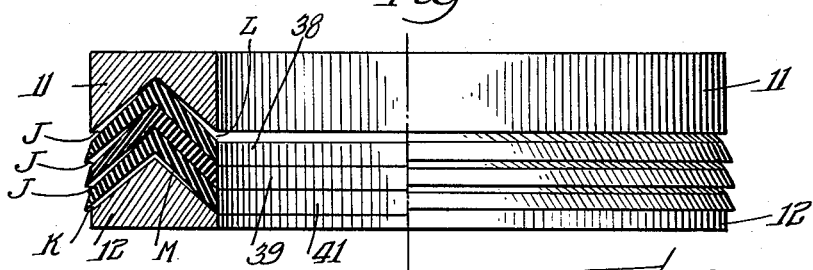
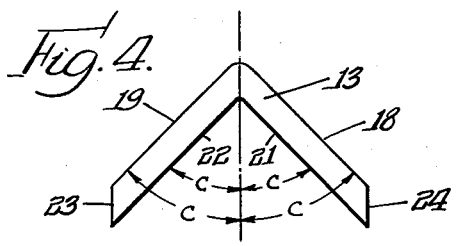
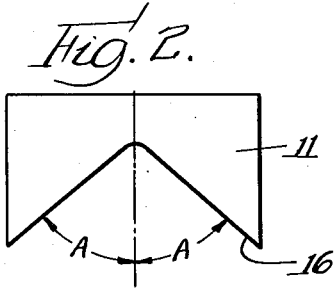
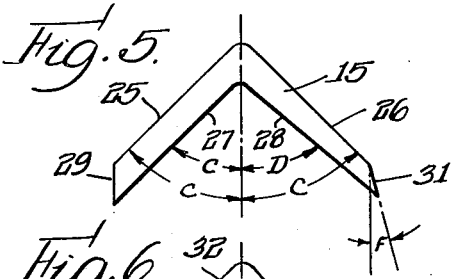
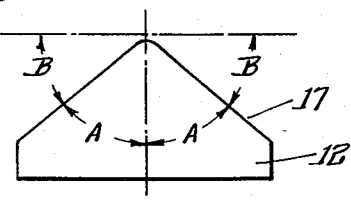
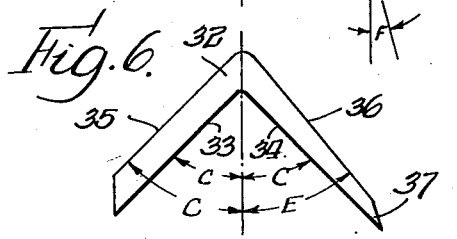

2,417,840

UNITED STATES PATENT OFFICE 2,417,840

PACKING RING

Lester W. Rodgers and Stanley H. Simpson, Evanston, Ill.

Application March 25, 1944, Serial No. 528,097

9 Claims. (Cl. 288—5)

The present invention relates to packing rings and more particularly to an improved packing ring and packing ring assembly to provide a seal in a mechanism utilizing a fluid medium under pressure.

In order to provide a seal in mechanisms operated by a fluid medium such as liquid, air or an aeriform substance at high pressures, it is customary to utilize a stuffing box provided with packing material generally in the form of packing rings. Packing rings are used to provide a seal between the piston head and the cylinder wall, and between a stuffing box wall and a piston rod. In providing a satisfactory seal against the fluid medium in mechanisms utilizing a fluid medium under pressure, there is encountered the problem of overcoming the static friction when the mechanism is placed in motion. Another problem is that of compensating for wear and preventing a packing from becoming fixed so that eventually a clearance is formed between the moving part and the packing.

In accordance with the present invention an improved packing seal is obtained by the use of a packing ring which is capable of providing a seal for relatively high pressures of fluid medium and yet offering a relative low static friction when the mechanism is placed in motion.

Further in accordance with the present invention a packing ring assembly is provided which allows for the wear occurring during operation.

It therefore is an object of the present invention to provide an improved packing ring for packing ring assemblies.

It is another object of the present invention to provide an improved packing ring assembly for a stuffing box.

It is still another object of the present invention to provide an improved packing ring and packing ring assembly in which the static friction is materially reduced.

Other and further objects of the present invention subsequently will become apparent by reference to the following description taken in connection with the accompanying drawing wherein Figure 1 is a view of a packing ring assembly as seen in cross section along the center line of such assembly;

Figure 2 is a detailed diagrammatic cross sectional view of one member of the packing ring assembly;

Figure 3 is a detailed diagrammatic cross sectional view of another element of the packing ring assembly;

Figure 4 is a diagrammatic cross sectional view of one of the packing rings which may be used in the assembly shown in Figure 1;

Figure 5 is a diagrammatic cross sectional view of a packing ring embodying the present invention;

Figure 6 is a diagrammatic cross sectional view of another modification of a packing ring made in accordance with the present invention; and Figure 7 is a view partially in cross section of a packing ring assembly made in accordance with the present invention.

Referring to Figure 1 there is shown a packing ring assembly having an upper packing gland 11, provided with a V-shaped surface, and a lower packing gland 12 provided with a complementary V-shaped surface. Between the upper and lower packing glands 11 and 12 there are located two V-shaped packing rings 13 and 14 between which is positioned a packing ring 15 having a distinctive configuration subsequently to be described.

Figures 2 and 3 respectively show diagrammatically in cross section the upper packing gland 11 and the lower packing gland 12. From a center line the V-shaped surfaces 16 are at equal angles such as the angle A for example which may be fifty degrees. The lower packing gland 12 has V-shaped surfaces 17 each of which is at the same angle A from the center line. Thus the V-shaped surfaces 17 are at an angle B with respect to a horizontal plane intersecting the apex of the angle formed by the surfaces 17. The members 11 and 12 have been termed packing glands since they perform a function commonly attributed to packing glands in that they are used to compress the packing between the surfaces 16 and 17 so as to cause the packing to spread outwardly to produce an effective seal between the stationary side of the assembly and the motion side. The members 11 and 12 may be made of iron or any material which does not deform as readily as the packing material interposed there between. The members 11 and 12 therefore may also function to a certain degree as packing rings where one of the member is positioned against a fixed surface and the other member is engaged by the conventional packing gland.

In the arrangement shown in Figure 1 the two V-shaped packing rings 13 and 14 are of a configuration illustrated in diagrammatic cross section in detail in Figure 4. From this figure it is apparent that the upper surfaces 18 and 19 of the packing are each at an angle C with respect to the center line. Similarly the inner surfaces 21 and 22 are each at an angle C with respect to the center line so that the packing has a uniform thickness and may be described as comprising a member having a cross section formed of two parallelograms. The angle C preferably is slightly smaller than the angle A of Figures 2 and 3 so that the surface area of the surfaces 16 and 17 of the gland members 11 and 12 is less than the surface areas of the surfaces 18, 19, 21, and 22 of the member 13 shown in Figure 4. Since the surfaces of the V-shaped packing ring 13 of the Figure 4 are greater in area than the surfaces provided by the gland members 11 and 12, it is obvious that pressure applied to the packing ring by the gland member forces the vertical edges 23 and 24 outwardly so as to engage the fixed or stationary surface adjacent the packing ring assembly and the motion surface which in Figure 1 may be assumed to be a piston rod.

The packing ring 15 has upper surfaces 25 and 26 each of which are at an angle C from the center line. The inner surface 27 is also at an angle C from the center line so that the left hand diagrammatic cross sectional portion shown in Figure 5 from the center line comprises a parallelogram. The other inner surface 28 is at an angle D with respect to the center line so that the cross sectional area from the center line comprises a trapezoid. The angle D is slightly greater than the angle C by an amount which may be five degrees. The parallelogram portion of a cross sectional area has an edge surface 29 which is parallel to the center line and hence is parallel to the stationary surface of the packing ring assembly. The trapezoidal cross-sectional portion has an edge portion 31 which may be at an angle F with respect to a line parallel to the center line. The angle F may be some angle between the limits of zero and fifteen degrees. By providing the surface 31 at an angle F there is provided material to compensate for the wear of the moving surface. Because of the fact that the right hand portion of the cross section shown in Figure 5 is gradually tapered it becomes apparent that an angle of clearance G appears between the packing rings 14 and 15 in Figure 1. Because the angle A differs from the angle C by a certain amount, there is also a clearance area equal to the angle H between the member 11 and the upper packing ring 13; and a similar angle H between the lower member 12 and the packing ring 14. The arrangement shown in Figure 1 shows the assembled rings and glands before a compressive force has been applied to cause the packing rings to be expanded. Consequently when pressure is applied between the upper and lower glands 11 and 12, the angles H disappear, but a small portion of the angle G may remain which may be substantially zero. Because the material contained in the trapezoidal portion from the center line of the packing ring 15 to the motion surface is less than that in the parallelogram portion on the other side of the center line, a certain desired operation takes place which produces an improved sealing action and also reduces materially the static friction when the moving element on the motion side of the packing ring is placed into motion.

The arrangement shown in Figure 1 has the effect of producing a greater compression on the stationary side of the ring assembly than on the other side where movement occurs thereby reducing the friction. While in Figure 1 this has been accomplished by forming the ring 15 so that the portion from the center line to the motion side is trapezoidal in cross section, a similar result may be accomplished by other arrangements. The arrangement desired is one whereby when the gland rings 11 and 12 are pressed together to expand and seat the packing rings 13, 14, and 15, the packing from the center line to the stationary side is compressed to a greater degree than the packing from the center line to the motion side. The degree of compression of the packing material adjacent the motion side may be so low as to be substantially zero. Such an arrangement produces a lesser static friction since the packing when in motion does not grip the adjacent surface with as great a pressure as otherwise would be the case and hence less force is required to break the packing loose from the surface when the surface is placed in motion. It is also believed that another operation takes place in such construction when the pressure of the fluid medium is built up to operate the mechanism. The pressure of the fluid medium compresses a portion of the packing adjacent to the motion surface so as to lessen or break the adhesion of the packing ring surfaces with the motion surface which adhesion accumulated while the motion surface was at rest. Thus the pressure of the fluid medium initiates an action on the packing rings which aids in materially reducing the static friction when the motion surface is moved from rest into motion.

The reduction in static friction can best be explained by the assumption that after the gland members 11 and 12 have been moved toward each other so as to eliminate the angle H shown in Figure 1, and a small amount of the angle G remains. The material between the center line of the packing rings 13, 14, and 15 and the motion side is under less stress of compression than is the material between the center line of these rings and the fixed or stationary side because of the shape of the ring 15. Thus when the piston rod begins to move past the surface 31 of the ring shown in Figure 6 not all of the surface 31 has a relative motion with respect to the piston rod so that initially certain increments of the surface have relative motion and that progressively increments of surface then have relative motion until finally there is a complete relative motion of the entire surface 31 with respect to the piston rod. Thus instead of holding the entire surface 31 fixed and producing relative motion between that surface and the piston rod at the instant that motion is initiated in the rod, the total static friction is less. Since the surface 31 is at an angle F with respect to a plane parallel to the center line sufficient material is provided on the motion side of the packing ring 15 to compensate for the wearing action of the piston rod. In addition another action also is obtainable which produces a better seal between the piston rod and the packing rod.

The ring 15 is preferably formed of a lastic or rubber-like material such as "Neoprene," "Hycar," or a "Buna-N" series synthetic rubber compound. The rings 13 and 14 may comprise rings of the more conventional leather or other type material. In the arrangement mentioned, the upper and lower members 11 and 12 were of iron, the rings 13 and 14 of leather, and the ring 15 of synthetic rubber. The members 11 and 12 had equal angles A of fifty degrees. The rings 13 and 14 had angles C of forty-five degrees. In the ring 15, the angle C was forty-five degrees and the angle D was fifty degrees and the angle F fifteen degrees. These various angles are merely recited by way of example to give some indication as to the values employed. Obviously of course for different pressures, sizes of rings, and areas of the movement of the rings there may be provided different angles and different materials. For example as previously stated it had been found that the angle F varied from zero to fifteen degrees.

In Figure 6 there is shown a diagrammatic cross sectional view of a packing ring 32 having two inner surfaces 33 and 34 each at an angle C with respect to the center line. One outer surface 35 is also at an angle C, whereas the other outer surface 36 adjacent the motion side is at an angle E. The angle E is slightly less than the angle C. This difference between the angles C and E is of the order of the difference between the angles C and D in Figure 5 which may be equal to as much as five degrees. The motion side of the ring 32 may have a surface 37 at an angle F with respect to a line parallel to the center line. Because of the difference between the angles C and E, it becomes apparent that in an assembly such as shown in Figure 1 there will again be provided in the uncompressed state a clearance angle similar to the angle G shown therein but this angle will be above the ring instead of below it where such ring is used with two V-shaped leather rings.

For certain applications it has also been found advantageous to utilize an assembly such as shown in Figure 7 wherein upper and lower gland members 11 and 12 are provided together with a plurality of rings 38, 39, and 41 each of which has a cross section corresponding to the cross sectional view shown in either Figure 5 or Figure 6. In Figure 7 the assembly shown is suitable for use to seal a piston against the cylinder wall. From the cross sectional view it will be seen that immediately above each of the rings 38, 39, and 41 there is a clearance in the form of the angle J. Between the lower gland member 12 and the bottom ring 41 there is a clearance space K. On the stationary side of the ring assembly there is a clearance L above the ring 38 which is in the form of an acute angle, and below the ring 41 between the center line and the stationary side there is a clearance angle M. The clearance areas K, L, and M substantially disappear when the glands 11 and 12 apply compression to the rings, and of course the angles J are also reduced.

From the foregoing it will be seen that there has been provided an improved packing ring and packing ring assembly which has been used advantageously in various applications involving a sealing action against a fluid medium. The packing ring and packing ring assembly may be used for hydraulic and pneumatic mechanisms of various types including gun recoil mechanisms.

While for the purpose of describing and illustrating the present invention certain specific embodiments have been shown and several examples have been given wherein specific values were mentioned, it is to be understood that the invention is not to be limited thereby since obviously such variations in the materials employed, the configurations used and the manner of assembly as are commensurate with the spirit and scope of the invention as set forth in the appended claims.

The present invention is hereby claimed as follows:

1. A packing ring for producing against a fluid medium a seal about a moving part comprising a member formed of a lastic or rubber-like material so as to have a generally V-shaped cross sectional area of uniform thickness from the center to the stationary side and of gradually decreasing thickness from the center to the motion side, said ring at the motion side having an outer edge surface normally extending outwardly at an acute angle to a plane parallel to the central line of said ring, said angle being within the range of zero to fifteen degrees.

2. A packing ring assembly comprising a plurality of packing rings having a V-shaped cross section retained in position by packing glands complementary to each other, said packing glands each having a smaller surface area than the cooperating surface area of the adjacent packing rings, at least one of said V-shaped rings being of a material having a different coefficient of friction and having on the stationary side of the center line a uniform cross sectional thickness and having on the motion side of the center line a cross sectional thickness decreasing toward the motion side.

3. A packing ring assembly comprising a plurality of packing rings having a V-shaped cross section, a pair of packing glands complementary to each other having V-shaped surfaces of lesser area than the areas of adjacent packing rings, at least one of said V-shaped rings being of a synthetic-rubber-like material having a different coefficient of friction than the remainder of said rings and having on the stationary side of the center line a uniform cross sectional thickness and on the motion side of the center line a tapering cross sectional thickness bounded by lines at an acute angle to each other of the order of five degrees.

4. A packing ring assembly comprising a plurality of rings having a V-shaped cross section, and a pair of packing glands complementary to each other having surfaces at acute angles at the normal surface of said rings, certain of said rings having a uniform cross sectional thickness, the remainder of said rings having a uniform cross sectional thickness from the center to the stationary side of the assembly and a cross sectional thickness decreasing from the center to the motion side, said latter rings having an outer edge surface on the motion side which is at an acute angle to the edges of said glands and said first mentioned packing rings.

5. A packing ring assembly comprising a plurality of packing rings having a V-shaped cross section, a pair of packing glands having V-shaped surfaces complementary to each other and having surfaces at acute angles to the normal surfaces of said rings, the angles between said packing gland surfaces being greater than the angle between the surfaces of the ring at least one of said rings having a uniform cross sectional thickness from the center to the stationary side of the assembly and a cross sectional thickness gradually and uniformly decreasing from the center to the motion side of the assembly whereby upon initiation of motion of the assembly progressive increments of said packing ring portion of decreasing cross sectional thickness are set in motion.

6. A packing ring assembly comprising a plurality of packing rings having a V-shaped cross section, a pair of packing glands complementary to each other and having surfaces at acute angles to the normal surfaces of said rings, said rings having a uniform cross sectional thickness from the center to the stationary side of the assembly and a cross sectional thickness gradually and uniformly decreasing from the center to the motion side of the assembly, said rings having outer edge surfaces on the bearing side which are each at an acute angle to a line parallel to the center line, said angle being within the range from zero to fifteen degrees.

7. A packing ring assembly comprising a plurality of rings having a V-shaped cross section and a pair of packing rings complementary to each other having surfaces of lesser area than the normal surface areas of said rings, certain of said rings being adjacent said packing glands and having a uniform cross sectional thickness, the remainder of said rings having a uniform cross sectional thickness from the center to the stationary side of the assembly and a cross sectional thickness gradually and uniformly decreasing from the center to the motion side of the assembly, said latter rings having a coefficient of friction different from that of first mentioned rings.

8. A packing ring having a generally V-shaped cross section comprising a parallelogram area from the center to the stationary side and a trapezoidal area from the center to the motion side, said trapezoidal area being bounded on the motion side by a surface at an acute angle to a plane parallel to the center line of said packing ring.

9. A packing ring assembly comprising a plurality of packing rings having a generally V-shaped asymmetrical cross section, a pair of packing glands having V-shaped surfaces of lesser areas than areas of adjacent packing rings, said packing glands and said packing rings having such cross sectional configurations that the portion of each packing ring from the center line to the stationary side has a greater cross sectional area and is under greater compressive stress than the portion of the packing ring from the center line to the motion side.

LESTER W. RODGERS.
STANLEY H. SIMPSON.

REFERENCES CITED

The following references are of record in the file of this patent:

UNITED STATES PATENTS

| Number | Name | Date |
| --- | --- | --- |
| 2,052,603 | Christenson | Sept. 1, 1936 |
| 2,188,957 | Pfauser | Feb. 6, 1940 |
| 1,796,724 | Rigby | Mar. 17, 1931 |
| 1,363,565 | Christenson | Dec. 28, 1920 |
| 1,771,890 | Hubbard et al. | July 29, 1930 |
| 2,365,046 | Bottomley | Dec. 12, 1944 |